United States Patent
Badjatiya et al.

(10) Patent No.: US 11,874,902 B2
(45) Date of Patent: Jan. 16, 2024

(54) TEXT CONDITIONED IMAGE SEARCH BASED ON DUAL-DISENTANGLED FEATURE COMPOSITION

(71) Applicant: Adobe Inc., San Jose, CA (US)

(72) Inventors: Pinkesh Badjatiya, Ujjain (IN); Surgan Jandial, Jammu (IN); Pranit Chawla, Delhi (IN); Mausoom Sarkar, New Delhi (IN); Ayush Chopra, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 429 days.

(21) Appl. No.: 17/160,862

(22) Filed: Jan. 28, 2021

(65) Prior Publication Data

US 2022/0237406 A1      Jul. 28, 2022

(51) Int. Cl.
| | |
|---|---|
| *G06F 18/25* | (2023.01) |
| *G06N 3/04* | (2023.01) |
| *G06F 16/538* | (2019.01) |
| *G06F 16/532* | (2019.01) |
| *G06F 16/535* | (2019.01) |
| *G06F 18/214* | (2023.01) |

(52) U.S. Cl.
CPC .......... *G06F 18/253* (2023.01); *G06F 16/532* (2019.01); *G06F 16/535* (2019.01); *G06F 16/538* (2019.01); *G06F 18/214* (2023.01); *G06F 18/251* (2023.01); *G06N 3/04* (2013.01)

(58) Field of Classification Search
CPC .... G06F 16/532; G06F 16/583; G06F 16/538; G06F 16/56; G06F 16/5866
See application file for complete search history.

(56) References Cited

U.S. PATENT DOCUMENTS

| | | | |
|---|---|---|---|
| 10,685,057 B1 * | 6/2020 | Chavez | ................. G06F 16/248 |
| 11,720,651 B2 | 8/2023 | Badjatiya et al. | |
| 2018/0329996 A1 * | 11/2018 | Perkins | ................... G06F 16/50 |

(Continued)

OTHER PUBLICATIONS

Chen et al.. "Image Search with Text Feedback by Visiolinguistic Attention Learning." (Year: 2020).*

(Continued)

*Primary Examiner* — Ross Varndell
(74) *Attorney, Agent, or Firm* — Finch & Maloney PLLC

(57) ABSTRACT

Techniques are disclosed for text conditioned image searching. A methodology implementing the techniques according to an embodiment includes receiving a source image and a text query defining a target image attribute. The method also includes decomposing the source image into image content and style feature vectors and decomposing the text query into text content and style feature vectors, wherein image style is descriptive of image content and text style is descriptive of text content. The method further includes composing a global content feature vector based on the text content feature vector and the image content feature vector and composing a global style feature vector based on the text style feature vector and the image style feature vector. The method further includes identifying a target image that relates to the global content feature vector and the global style feature vector so that the target image relates to the target image attribute.

20 Claims, 10 Drawing Sheets
(2 of 10 Drawing Sheet(s) Filed in Color)

(56) References Cited

U.S. PATENT DOCUMENTS

| | | | |
|---|---|---|---|
| 2020/0356592 A1* | 11/2020 | Yada | G06F 16/538 |
| 2021/0124976 A1 | 4/2021 | Kim | |
| 2021/0256365 A1 | 8/2021 | Wang | |
| 2022/0084677 A1 | 3/2022 | Gupta | |

OTHER PUBLICATIONS

Ak, et al., "Learning Attribute Representations with Localization for Flexible Fashion Search," IEEE/CVF Conference on Computer Vision and Pattern Recognition, 2018. pp. 7708-7717.

Antol, et al., "VQA: Visual Question Answering," IEEE International Conference on Computer Vision (ICCV), 2015. pp. 2425-2433.

Barman, A. and Shah, S.K, "A Graph-based Approach for Making Consensus-based Decisions in Image Search and Person Re-identification," IEEE Transactions on Pattern Analysis and Machine Intelligence, 2019. pp. 1-12.

Chen, et al., "Image Search with Text Feedback by Visiolinguistic Attention Learning," IEEE/CVF Conference on Computer Vision and Pattern Recognition, 2020. pp. 3001-3011.

Cho, et al., "Learning Phrase Representations using RNN Encoder-Decoder for Statistical Machine Translation," Proceedings of the Conference on Empirical Methods in Natural Language Processing (EMNLP), Sep. 3, 2014. 15 pages.

Chopra, et al., "Powering Robust Fashion Retrieval With Information Rich Feature Embeddings," Proceedings of the IEEE/CVF Conference on Computer Vision and Pattern Recognition (CVPR) Workshops, 2019. 9 pages.

Dutta, T. and Biswas, S., "s-SBIR: Style Augmented Sketch based Image Retrieval," Proceedings of the IEEE/CVF Winter Conference on Applications of Computer Vision (WACV), 2020. pp. 3261-3270.

Fu, et al., "Dual attention network for scene segmentation," Proceedings of the IEEE Conference on Computer Vision and Pattern Recognition, 2019. pp. 3146-3154.

Gao, et al., "Dynamic Fusion With Intra- and Inter-Modality Attention Flow for Visual Question Answering," Proceedings of the IEEE Conference on Computer Vision and Pattern Recognition (CVPR), 2019. pp. 6639-6648.

Guo, et al., "Dialog-based Interactive Image Retrieval," 32 Conference on Neural Information Processing Systems (NeurIPS), 2018. 11 pages.

Halawani, et al., "Fundamentals and Applications of Image Retrieval: An Overview," Datenbank-Spektrum, vol. 18, 2006 pp. 14-23.

Lecun, et al., "Deep Learning," Nature, vol. 521, May 28, 2015. pp. 436-444.

Lee, et al., "Stacked cross attention for image-text matching," Proceedings of the European Conference on Computer Vision (ECCV), 2018. 16 pages.

Mai, et al., "Spatial-Semantic Image Search by Visual Feature Synthesis," IEEE Conference on Computer Vision and Pattern Recognition (CVPR), 2017. pp. 4718-4727.

Patro, B. and Namboodiri, V.P., "Differential Attention for Visual Question Answering," IEEE Conference on Computer Vision and Pattern Recognition (CVPR), 2018. pp. 7680-7688.

Radenovic, et al., "Fine-Tuning CNN Image Retrieval with No Human Annotation," IEEE Transactions on Pattern Analysis and Machine Intelligence Jul. 10, 2018. 14 pages.

Sarafianos, et al., "Adversarial Representation Learning for Text-to-Image Matching," Proceedings of the IEEE/CVF International Conference on Computer Vision (ICCV), 2019. pp. 5814-5824.

Singhal, et al., "Towards a Unified Framework for Visual Compatibility Prediction," Proceedings of the IEEE/CVF Winter Conference on Applications of Computer Vision (WACV), 2020. pp. 3607-3616.

Sinha, et al., "Attention Based Natural Language Grounding by Navigating Virtual Environment,". IEEE Winter Conference on Applications of Computer Vision (WACV), Dec. 21, 2018. 9 pages.

Tellex, et al., "Understanding natural language commands for robotic navigation and mobile manipulation," Twenty-fifth AAAI conference on artificial intelligence, 2011. pp. 1507-1514.

Vo, et al., "Composing text and image for image retrieval—an empirical odyssey," Proceedings of the IEEE Conference on Computer Vision and Pattern Recognition, 2019. pp. 6439-6448. 6439-6448.

Xu, et al., "Cross-Modal Attention With Semantic Consistence for Image-Text Matching," IEEE Transactions on Neural Networks and Learning Systems, vol. 31, No. 12, Dec. 2020. pp. 5412-5425.

Yu, et al., "Sketch me that shoe," Proceedings of the IEEE Conference on Computer Vision and Pattern Recognition, 2016. pp. 799-807.

Zeiler, M.D. and Fergus, R., "Visualizing and Understanding Convolutional Networks," Computer Vision ECCV, 2014. pp. 818-833.

Zhang, et al., "Self-attention generative adversarial networks," International Conference on Machine Learning, 2019. 10 pages.

Zhao, et al., "Memory Augmented Attribute Manipulation Networks for Interactive Fashion Search," IEEE Conference on Computer Vision and Pattern Recognition (CVPR), 2017. pp. 1520-1528.

U.S. Appl. No. 17/160,893, filed Jan. 28, 2021 (55 pages).

* cited by examiner

Images
600

Source Image
210

Source Image Content:
dress

215

Image Database
370

Target Image
240

Target Image Style:
Short Length
Sleeveless
Thin Straps
Shiny

245

TEXT CONDITIONED IMAGE SEARCH BASED ON DUAL-DISENTANGLED FEATURE COMPOSITION

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates to image searching. Particularly, this disclosure relates to systems and methods for text conditioned image searching based on composition of disentangled style and content features.

BACKGROUND

Online shopping represents a significant and increasing portion of world economic activity. Vendors typically provide online catalogs from which users can shop. Such catalogs can be extensive, and it can be difficult for the user to find the item that precisely meets their desires or requirements. Various types of product search functions that incorporate user feedback are typically provided, but there remain a number of non-trivial issues with respect to such text conditioned image search systems including the inability to capture detailed user requirements which cannot be precisely encapsulated with only a single image or a combination of keywords. These shortcomings of existing systems can discourage the shopper and potentially result in a lost sales opportunity. The reason for these limitations is that existing systems lack the capability to disentangle content features from style features (of the image and text) and are therefore limited in their ability to understand subtleties with respect to the content and style features. Therefore, complex and non-trivial issues associated with text-conditioned image search remain.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
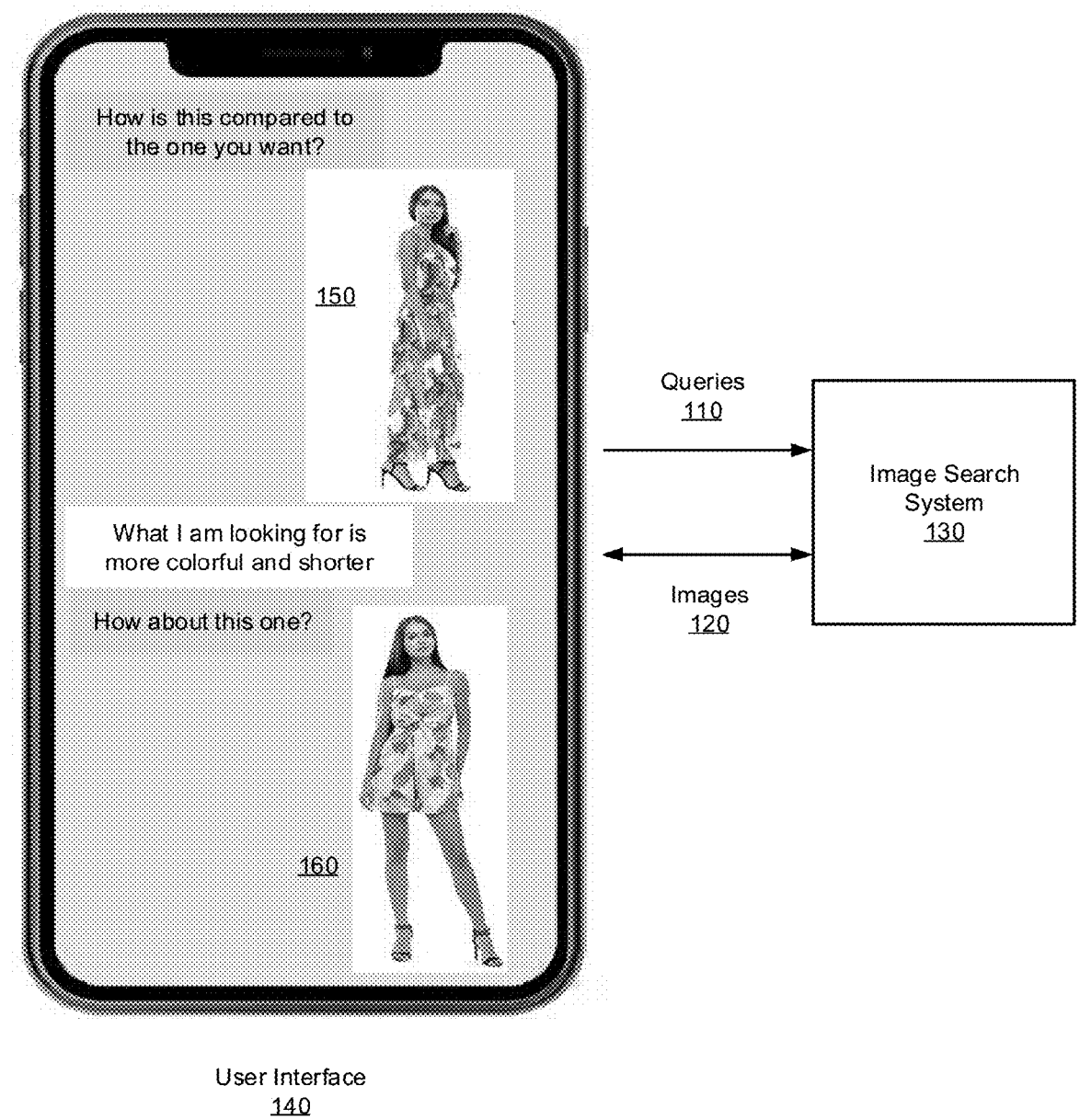
FIG. 1 illustrates user interaction with an image search system, in accordance with an embodiment of the present disclosure.

Techniques are disclosed for improved text conditioned image search. The techniques can be applied to the problem of retrieving a user's desired image from a catalogue based on a provided source image (as a reference) in combination with user feedback in the form of a text query. For example, the user may state that the item shown in the source image (e.g., the content of the source image) is close to what they are looking for, but that they would prefer a different style (e.g., size and color), which they go on to specify. The system returns feedback conditioned results in the form of a target image which the user may accept, or the user may provide additional feedback to further refine the search process. In any case, the user is provided with an image that meets the given search criteria, the given search criteria including a source image and textual guidance.

Existing techniques for searching based on a source image and user text query typically extract features from the image and features from the text query, and then jointly project those features into the same feature space to generate target features that represent an understanding of what the user is searching for and are used to guide the search. These techniques, however, fail to separate the content features from the style features of the image and text, and are therefore limited in their ability to understand subtleties with respect to the content and style features. For instance, if a given source image depicts a model wearing a relatively short black and strapless dress, and the text query indicates something like "longer and more patterned and is red," existing techniques might return various longer red dresses that may or may not have straps, because such existing techniques do not acknowledge the difference between style (e.g., strapless) and content (e.g., dress) of a given image. In a more general sense, existing techniques are incapable of understanding how each of style and content of a given source image changes (or doesn't change) when the text-feedback is applied.

In contrast, the techniques disclosed herein, for text conditioned image search, employ a process for disentangling the content features of the image and text from the style features of the image and text. This approach allows for modification of the image content by the text content independent of modification of the image style by the text style. Thus, the techniques disclosed herein provide a better understanding of how image content and image style each change when text feedback is applied. Note that the text feedback may change only the image content (e.g., the target dress), or only the image style (e.g., color and length of the target dress), or both content and style. Further note that the text feedback may change one or more styles depicted in the image but not all (e.g., the text includes language that changes color and length of the target dress, but includes no language with respect to straplessness of the dress and thus leaves the strapless style depicted in the dress unchanged). Thus, style features of the image that are unchanged by the text query are better preserved in the target image. This allows the system to better capture and utilize detailed and potentially complex user requirements as collectively expressed in the image and text query. Target features can then be generated which are more accurately tailored to the user's desires and which in turn provide improved image search results.

The separation of content and style is referred to herein as disentanglement and is accomplished using machine learning. In one example embodiment, an image search system includes a first neural network trained to decompose the given source image into an image content feature vector and an image style feature vector. Note that the image style is descriptive of the image content. The system further includes a second neural network trained to decompose the given text query into a text content feature vector and a text style feature vector. The text query defines a target image attribute. Each neural network includes one or more layers having unique sets of weighting factors associated with a neuron or pathway between neurons. The weighting factors result from training of the network. These weights characterize the network's intelligence and ability to decompose and disentangle content from style, as variously described herein.

The system further includes a first vector combiner that concatenates or otherwise combines the text style feature vector and the image style feature vector to compose a global style feature vector, and a second vector combiner concatenates or otherwise combines the text content feature vector and the image content feature vector to compose a global content feature vector. The system can then search for a target image that corresponds to the global content feature vector and the global style feature vector, so that the target image relates to the target image attribute.

While this disclosure focuses on image retrieval (for example, retrieval of images from a catalog), many other applications are possible including music search, document search, booking travel arrangement (where the user modifies details of the given music, document, or travel plan with a text query), and photo editing (where the user requests changes in a given image with a text query), to name just a few. For example, in the case of music search, an audio encoding neural network would be used instead of an image encoding neural network. Numerous embodiments will be appreciated in light of this disclosure.

Definition of Terms

Figure 6:
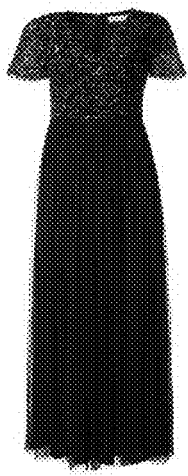
FIG. 6 illustrates one example of source and target images including content and style, in accordance with an embodiment of the present disclosure.
Figure 6:
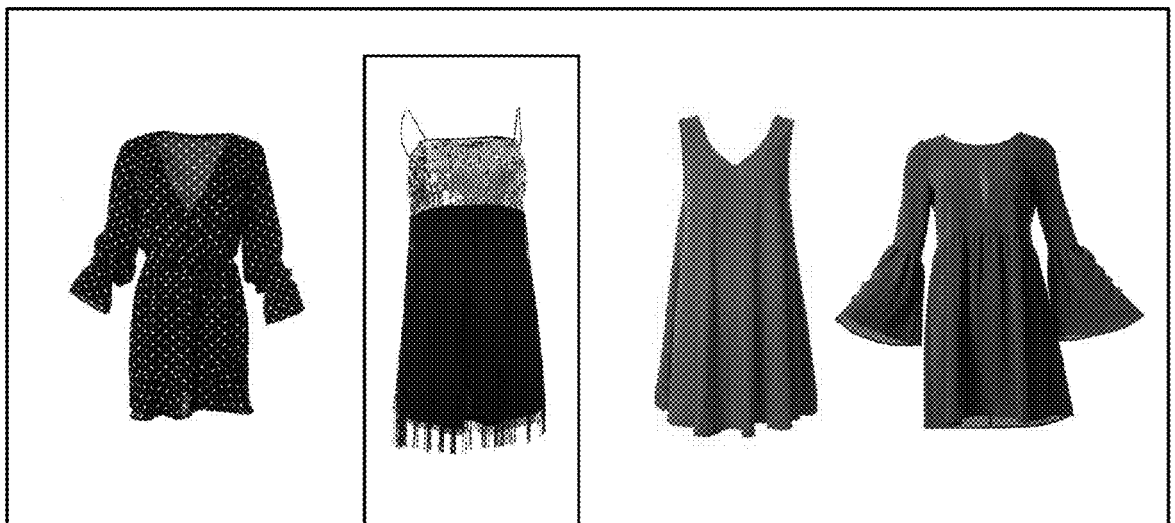

The term "source image" (or "reference image") as used herein refers to an image that is used as the starting point for a search or for an iteration of the search. The source image may depict an item, product, or object, that illustrates, to some degree, what the user is searching for. An example source image 210 is shown in FIG. 6.

The term "target image" as used herein refers to an image that is generated or otherwise returned as a result of the search (or an iteration of the search). An example target image 240 is also shown in FIG. 6.

The term "text query" as used herein refers to a text string that is provided by the user to describe the item that they are searching for or to provide feedback regarding the target image that was generated from a previous search iteration. An example text query could be "I'm looking for a casual dress," or "what I'm looking for is shorter and more colorful." To this end, the text query can be thought of as a supplement to and/or a refinement of the source image (where the text query is additive to the source image) and/or a modifier of the source image (where the text query changes one or more features of the source image).

The term "content" as used herein refers to attributes that describe the object or subject of the image or the query (i.e., image content and text content respectively). For example, content could be "dress," "shoe," or "car."

The term "style" as used herein refers to attributes that provide additional detail regarding the content of the image or the query (i.e., image style and text style respectively). For example, style could include "short sleeve," "strapless," and/or "red with black stripes." Style is descriptive of content.

The term "feature" as used herein refers to data generated by the neural networks which encapsulate and represent properties of image content, image style, text content, and text style. For example, an image content feature is generated by the image encoding neural network and represent properties associated with the content of the image. An image style feature is also generated by the image encoding neural network and represents properties associated with the style of the image. A text content feature is generated by the text encoding neural network and represents properties associated with the content of the text. A text style feature is generated by the text encoding neural network and represent properties associated with the style of the text.

The term "image content feature vector" as used herein refers to a set of image content features. For example, an image content feature vector comprises image content features that are generated by the image encoding neural network which represent properties associated with the content of the image.

The term "image style feature vector" as used herein refers to a set of image style features. For example, an image style feature vector comprises image style features that are generated by the image encoding neural network which represent properties associated with the style of the image.

The term "text content feature vector" as used herein refers to a set of text content features. For example, a text content feature vector comprises text content features that are generated by the text encoding neural network which represent properties associated with the content of the text.

The term "text style feature vector" as used herein refers to a set of text style features. For example, a text style feature vector comprises text style features that are generated by the text encoding neural network which represent properties associated with the style of the text.

The term "global content feature vector" as used herein refers to a concatenation (e.g., appending) of the image content feature vector to the text content feature vector.

The term "global style feature vector" as used herein refers to a concatenation (e.g., appending) of the image style feature vector to the text style feature vector.

The term "target composite feature vector" as used herein refers to a fusion of the global content feature vector and the global style feature vector.

The terms "fusion" or "fusing" as used herein with respect to two vectors refers to the calculation of an offset between the two vectors, which may be followed by a scaled normalization of that offset.

General Overview

As noted previously, the available technical solutions for image searching are inadequate, particularly when the search space (e.g., catalog or database) is large and detailed user requirements cannot be adequately captured with a single image or combination of keywords. Many existing approaches do not allow the user to engage in a dialog and interactively provide feedback to enable efficient navigation of the catalog. Although some existing search techniques can incorporate textual feedback from the user, these techniques, as previously described, fail to separate the content features from the style features (of both the image and the text) and are therefore limited in their ability to fine tune modifications to the content and style features based on the text feedback. For example, these existing techniques are incapable of understanding how each of style and content of a given source image changes (or doesn't change) when the text-feedback is applied. As such, a technical solution for better image-based search as provided herein is needed.

To this end, techniques are provided herein for text conditioned image search based on dual-disentangled feature composition which separates out the content and style features from both the given image and the given text query to generate improved context aware features for image retrieval, as will be explained in greater detail below. The techniques provide an improvement in searching efficiency and accuracy over existing technical solutions, which fail to capture and utilize detailed and potentially complex user requirements.

In more detail, a methodology implementing the techniques according to one example embodiment includes receiving a source image and a text query defining target image attributes. The method also includes using a first neural network to decompose the source image into an image content feature vector and an image style feature vector that are disentangled from each other. The method further includes using a second neural network to decompose the text query into a text content feature vector and a text style feature vector that are also disentangled from each other. More specifically, one or more of the layers of these neural networks are configured during training to extract content features and style features from the image and text.

The method further includes composing a global content feature vector based on the text content feature vector and the image content feature vector and composing a global style feature vector based on the text style feature vector and the image style feature vector. The method further includes identifying a target image that relates to the global content feature vector and the global style feature vector so that the target image relates to the target image attributes. Many other variations and alternative embodiments will be appreciated in light of this disclosure.

FIG. 1 illustrates user interaction 100 with an image search system 130, in accordance with an embodiment of the present disclosure. A user interface 140 is shown, which may be hosted on any suitable platform such as a smart phone, tablet, mobile device, laptop, workstation, etc. The user interface 140 is presented to the user to allow the user to interact with the image search system 130 through a series of queries 110 and images 120. For example, an initial image 150 of a dress is presented to the user along with a question: "How is this compared to the one you want?" The user then replies with a text query/response: "What I am looking for is more colorful and shorter." The image search system 130, then provides a target image 160, which more closely matches the user's requirements, for example by finding a dress with most of the same characteristics as the dress in the source image, but shorter and more colorful. If the user is not completely satisfied, the process may be repeated any number of times until the correct target image is obtained.

Framework and System Architecture

Figure 2:
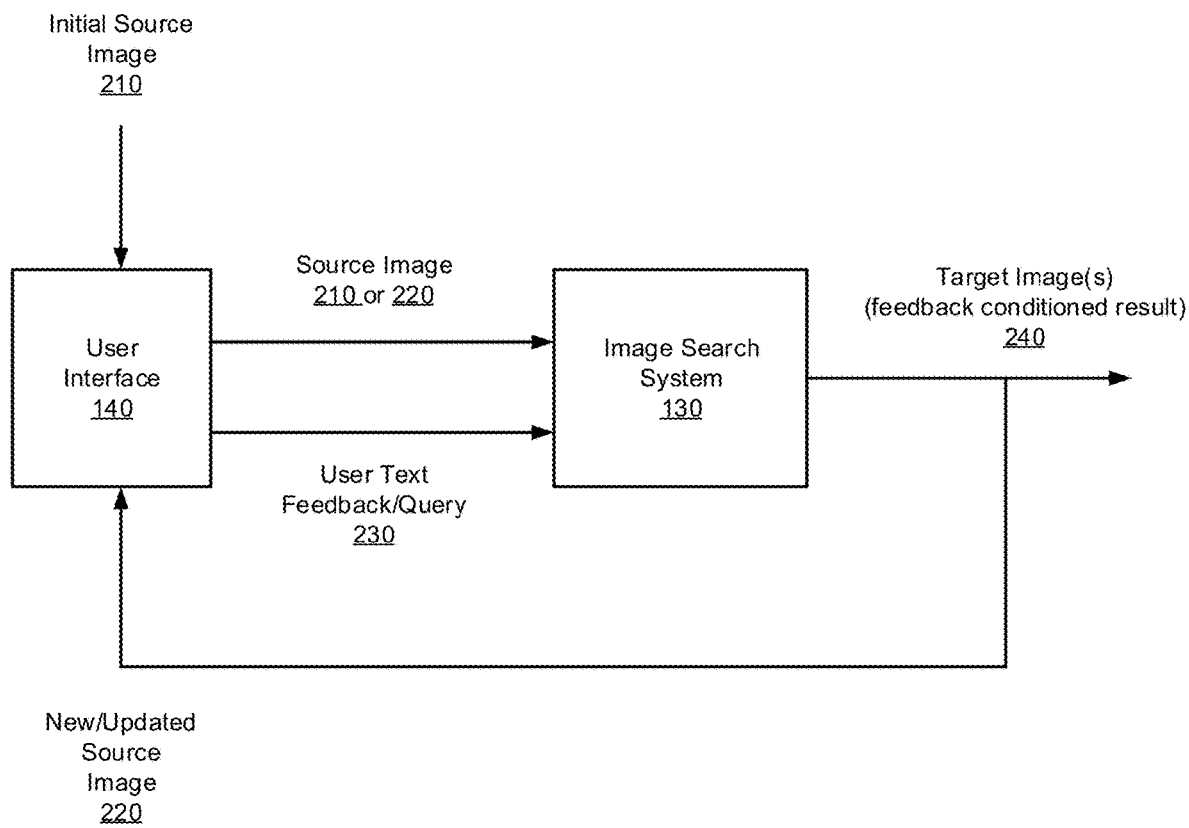
FIG. 2 illustrates operation of the image search system, in accordance with an embodiment of the present disclosure.

FIG. 2 illustrates operation 200 of the image search system 130 at a high level, in accordance with an embodiment of the present disclosure. In some embodiments, the image search system 130 may be part of a larger e-commerce system, or other application. The user interface 140 is shown to accept an initial source or reference image 210, which may be provided by the user, the e-commerce system, or from any other source. The source image 210 is presented to the image search system 130, along with a user text query 230. The text query provides additional details about the user's requirements. For example, the query may indicate that the user is looking for something similar to the source image 210, but in a different color and/or size, or it may indicate that the user is looking for something entirely different from the source image. The image search system 130 is configured to process the image 210 and the text query 230 to extract content and style feature vectors from the image and the text in an independent and disentangled manner, and then recombine those feature vectors to be used as parameters for a search through the catalog or database of images from which the user is shopping. By disentangling the content features from the style features, the content and style may be manipulated independently based on the text query. The image search system 130 generates a target image 240 as a user feedback condition result which is presented to the user, through the user interface 140, as the new/updated source image 220.

In an example use case, an initial source image depicts a sedan style automobile and the user text query specifies that the user is looking for something sportier, with two doors, and in a red color. In this case, the content is automobile and the style includes attributes such as sporty, two doors, and red. The image search results in a target image that depicts a sports car based on the user's preferences. The process may then repeat allowing the user to refine the search or make other change requests.

In another example use case, the user is searching for a particular photograph of the Eiffel Tower. The initial source image depicts the Tower during the day and surrounded by tourists. The text query indicates that the user desires an image taken at night with the tower lit up and without people in the foreground. In this case, the content is the Eiffel Tower and the style includes nighttime, lit up, and absence of crowds.

It will be appreciated that numerous other applications and example use cases are possible in light of the present disclosure. Such applications increase search efficiency through an inventory of products, improve the user experience, and potentially increase sales.

Thus, the foregoing framework provides a system and methodology for text conditioned image searching based on dual-disentangled feature composition. Numerous example configurations and variations will be apparent in light of this disclosure.

Figure 3:
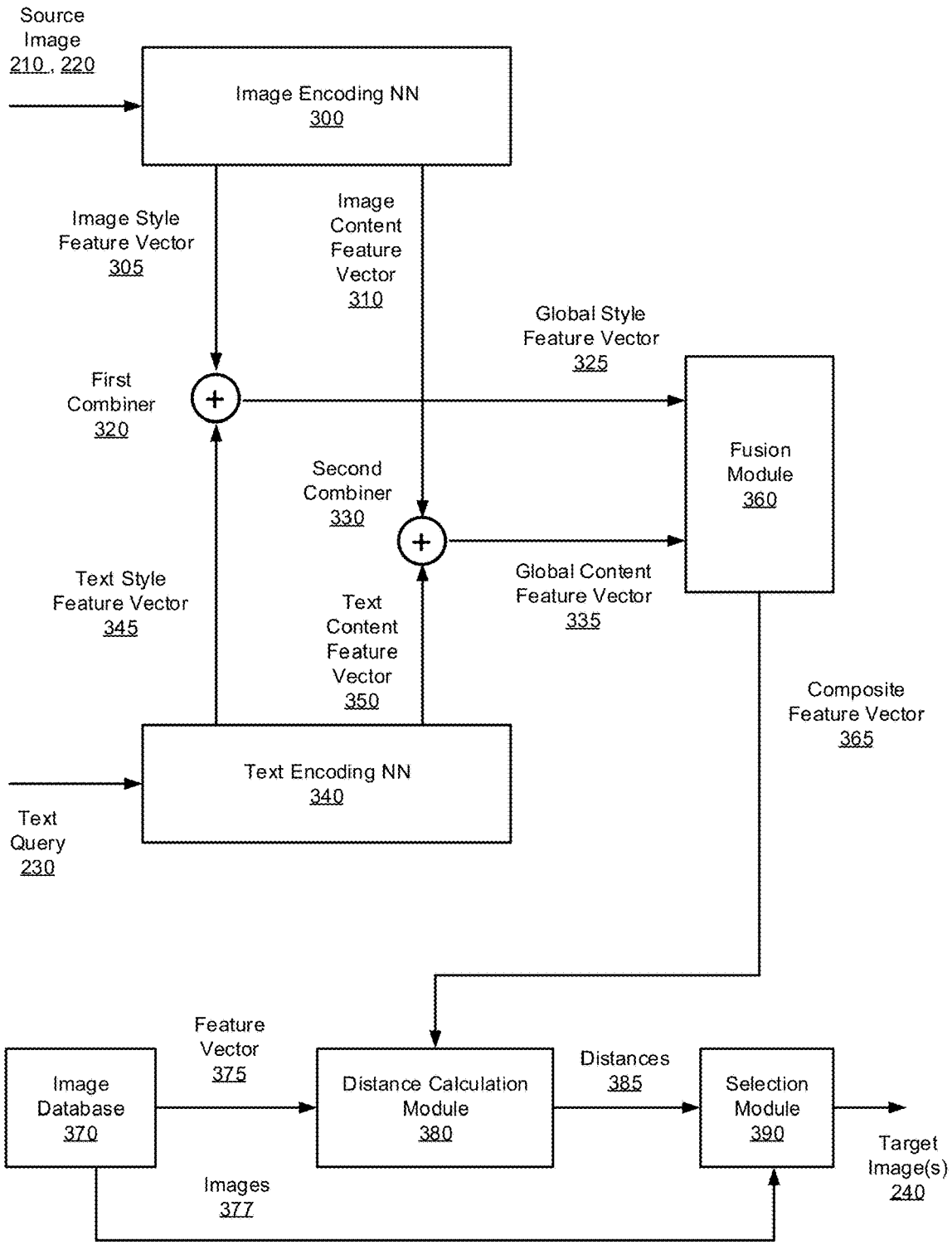
FIG. 3 is a block diagram of the image search system, configured in accordance with an embodiment of the present disclosure.

FIG. 3 is a block diagram of the image search system 130, configured in accordance with an embodiment of the present disclosure. The image search system 130 is shown to include an image encoding neural network 300, a text encoding neural network 340, a first combiner 320, a second combiner 330, a fusion module 360, an image database 370, a distance calculation module 380, and a selection module 390.

The image encoding neural network 300 is configured to generate an image style feature vector 305 and an image content feature vector 310 associated with a source image (whether initial 210 or updated 220). As previously noted, image style is descriptive of image content. The operation of the image encoding neural network 300 will be described in greater detail below in connection with FIG. 4.

The text encoding neural network 340 is configured to generate a text style feature vector 345 and a text content feature vector 350 associated with a text query. The operation of the text encoding neural network 340 will be described in greater detail below in connection with FIG. 5.

The first combiner 320 is configured to combine (e.g., concatenate) the image style feature vector 305 with the text style feature vector 345 to generate a global style feature vector 325. In some embodiments, the combination is a concatenation of the feature vectors. For example, a vector of image style features can be concatenated to a vector of text style features. The second combiner 330 is configured to combine (e.g., concatenate) the image content feature vector 310 with the text content feature vector 350 to generate a global content feature vector 335. The global style feature vector 325 and the global content feature vector 335 provide the disentanglement of style from content.

The fusion module 360 is configured to fuse the global style feature vector 325 with the global content feature vector 335 to generate a composite feature vector 365. In some embodiments, the fusion is performed by calculating a residual offset between the global style feature vector 325 and the global content feature vector 335, and then normalizing the residual offset. In some embodiments, this could be expressed by the following equation:

$$f_{com} = \delta \frac{f_{GS} + f_{GC}}{\|f_{GS} + f_{GC}\|_2}$$

where $f_{GS}$ is the global style feature vector 325, $f_{GC}$ is the global content feature vector 335, the δ parameter denotes a trainable normalization scale, and $\|\bullet\|_2$ denotes the $L_2$ norm.

The image database 370 is configured to store and provide potential target images 377 (e.g., images of items, objects, or products for which the user may be searching). The database also stores feature vectors 375 that are associated with each potential target image 377.

The distance calculation module 380 is configured to calculate a distance 385 between the composite feature vector 365 (which is based on the source image 210, 220 and the text query 230) and the feature vector 375 associated with the potential target images. In some embodiments, the distance 385 is calculated as a Euclidean distance or a cosine distance.

The selection module 390 is configured to select one or more of the potential target images 377 as an identified target image 240 based on the distances 385. For example, in some embodiments, if the distance 385 is less than a threshold value, the potential target image 377 is considered to be close enough to the user's request (in the form of source image and text query) to be considered a suitable target image 240 for presentation to the user. The user may then accept the proffered target image 240, or continue the search using the target image 240 as a new/updated source image 220 in combination with a new text query 230 to refine the search.

Figure 4:
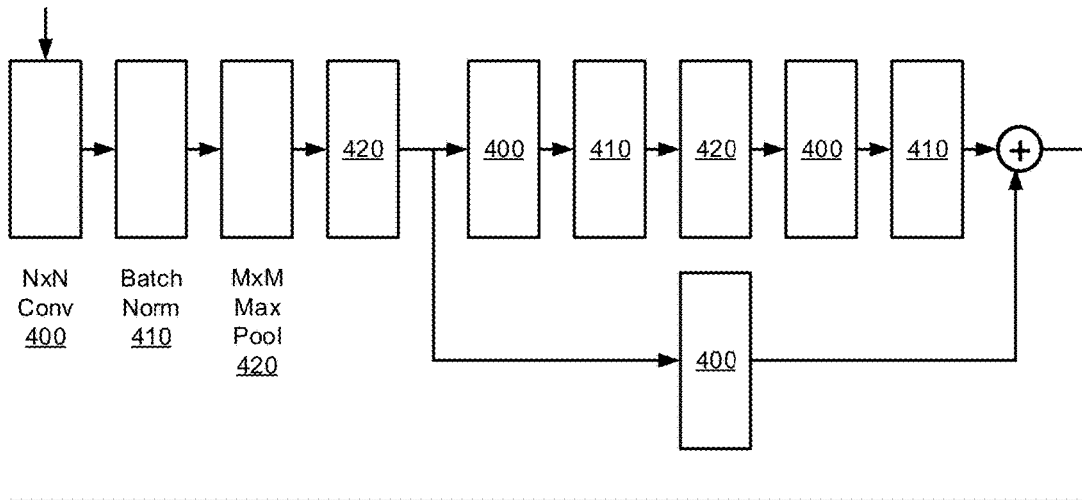
FIG. 4 is a block diagram of the image encoding neural network, configured in accordance with an embodiment of the present disclosure.
Figure 4:
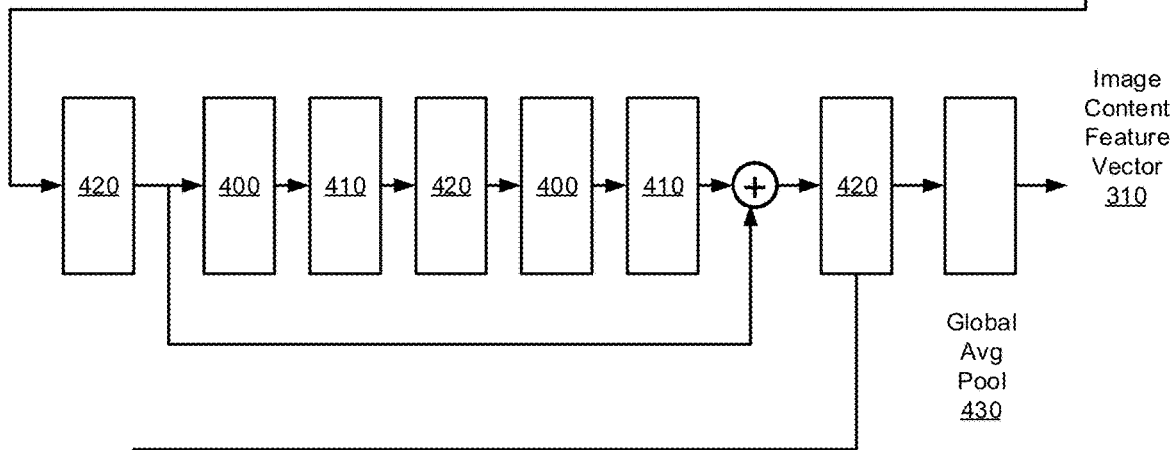
Figure 4:
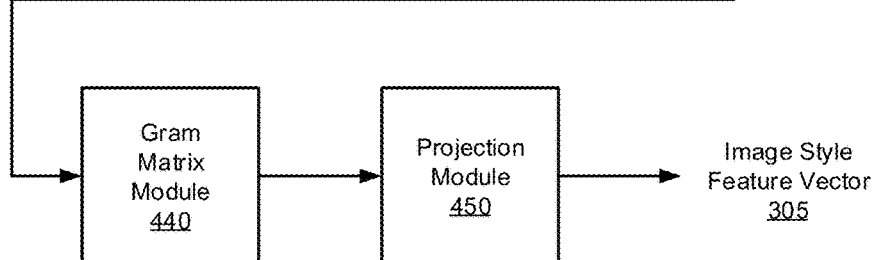

FIG. 4 is a block diagram of the image encoding neural network 300, configured in accordance with an embodiment of the present disclosure. The image encoding neural network 300 is shown to comprise a stack of layers that include N×N convolutional layers 400, batch normalization layers 410, and M×M max pooling layers 420, that are interconnected in a repeating manner as shown. In some embodiments, N is 7 and M is 3. Additionally, the image encoding neural network 300 includes a global average pooling layer 430, a Gram Matrix module 440, and a projection module 450. In some embodiments, the image encoding neural network 300 is implemented as a ResNet neural network, although other such commercially available neural networks may be used, in light of the present disclosure. The source image 210, 220 is provided to the first N×N convolutional layer 400. The image content feature vector 310 is generated by the global average pooling layer 430 which is applied to the output of the final M×M max pooling layer 420. The separate image style feature vector 305 is generated by the Gram matrix module 440 and the projection module 450 which are applied to the output of the final M×M max pooling layer 420. The training process for the image encoding neural network 300 is described in greater detail below in connection with FIGS. 7 and 8.

Figure 5:
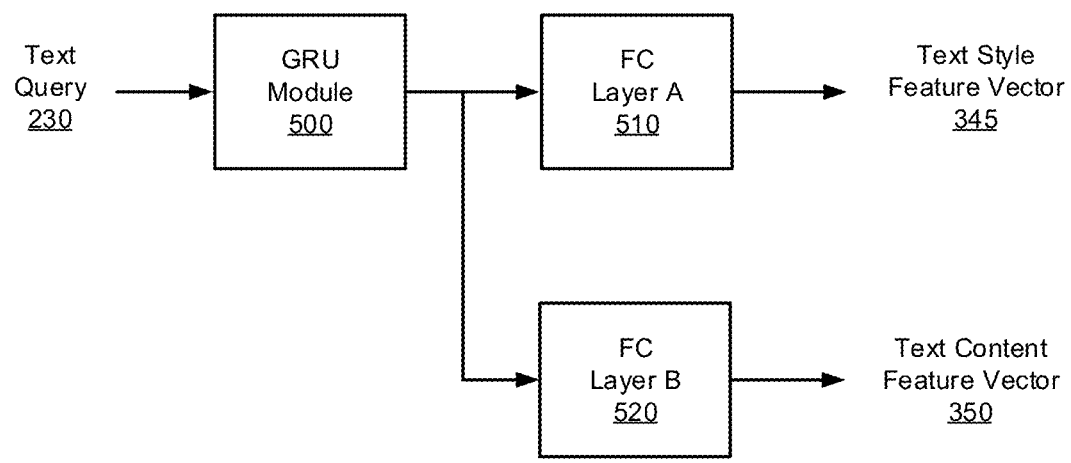
FIG. 5 is a block diagram of the text encoding neural network, configured in accordance with an embodiment of the present disclosure.

FIG. 5 is a block diagram of the text encoding neural network 340, configured in accordance with an embodiment of the present disclosure. The text encoding neural network 340 is shown to include a Gated Recurrent Unit (GRU) module 500, a first Fully Connected (FC) layer (layer A) 510 and a second parallel FC layer (layer B) 520. FC layer A 510 is trained to generate a text style feature vector 345 and FC layer B 520 is trained to generate a text content feature vector 350. The training process is described in greater detail below in connection with FIGS. 7 and 8.

FIG. 6 illustrates one example of images 600, including source and target images and associated content and style, in accordance with an embodiment of the present disclosure. An example source image 210 is shown, for which the image content 215 is "dress." A small sampling of the image database 370 is also shown to include four images associated with the content "dress." The second of those images is chosen as the target image 240, based on the style 245 of "short length," "sleeveless," "thin straps," and "shiny" which match up with a user's source image and text query. Existing techniques might ignore the fact that the source image dress is black and return a red dress that matches some of the style requirements of the text query, if the text query does not explicitly call for a black dress.

Figure 7:
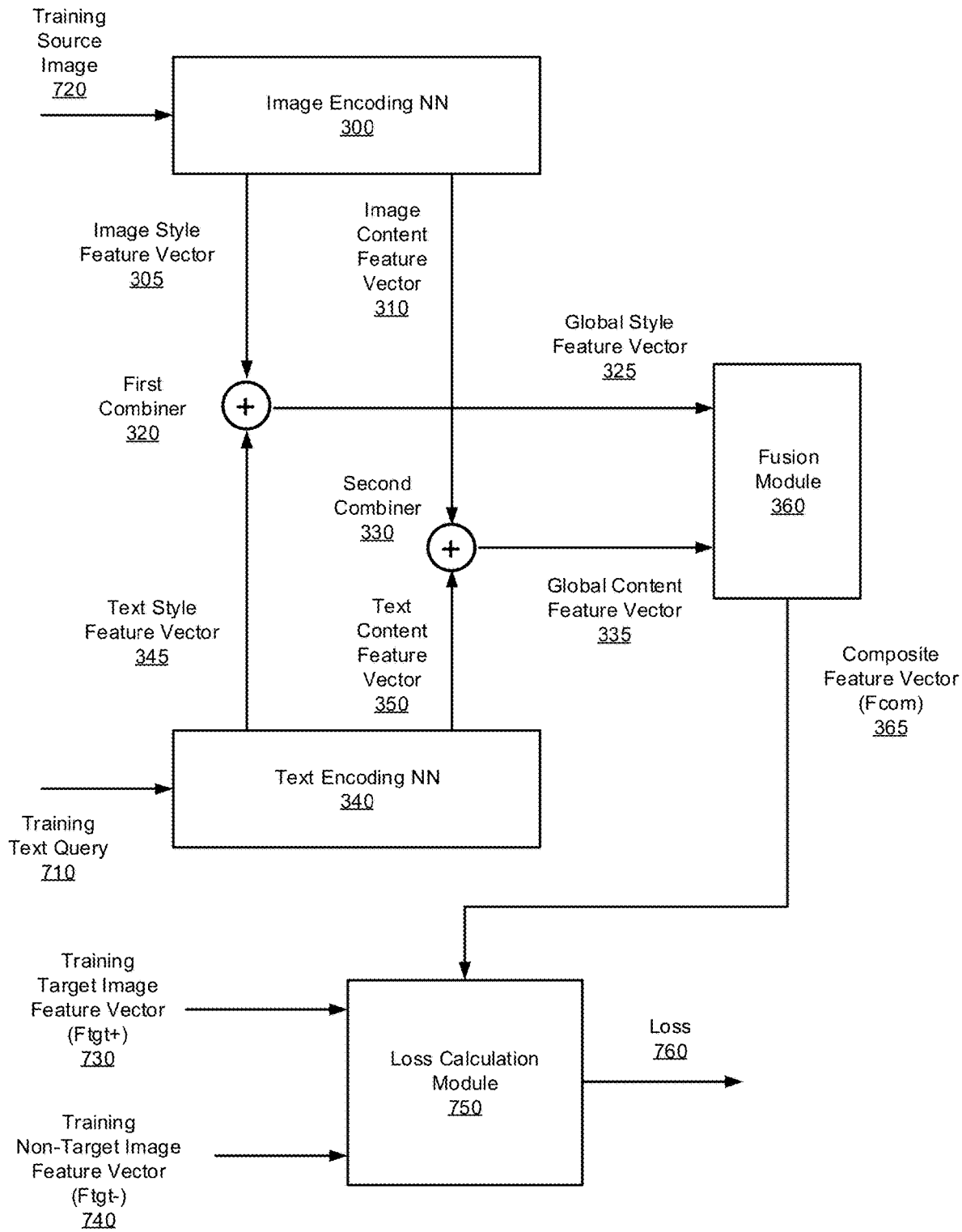
FIG. 7 is a block diagram of a system for training of the image search system, configured in accordance with an embodiment of the present disclosure.

FIG. 7 is a block diagram of a system 700 for training of the image search system 130, configured in accordance with an embodiment of the present disclosure. The training system 700 is shown to include a loss calculation module 750 which is configured to generate loss values 760 for training of the image encoding neural network 300, the text encoding neural network 340, and the fusion module 360 of the image search system 130. A training database is employed which provides training source images 720, training text queries 710, training target image feature vectors 730, and training nontarget image feature vector 740. The training target image feature vector 730 provides features associated with training target images that should be offered to the user by the image search system 130, in response to the training source image 720 and the training text query 710. The training non-target image feature vector 740 provides features associated with training non-target images that should be rejected by the image search system 130, in response to the training source image 720 and the training text query 710.

For each training iteration, a training source image 720 is provided to the image encoding neural network 300 and a training text query 710 is provided to the text encoding neural network 340. Global style feature vector 325, and global content feature vector 335 are generated and fused to create composite feature vector 365, as previously described in connection with the operation of the training image search system. The loss calculation module 750 is configured to generate loss values 760 based on a measure of similarity between the composite feature vector ($F_{com}$) 365 and the training target image feature vector ($F_{tgt}+$) 730, and a measure of difference between the composite feature vector ($F_{com}$) 365 and the training non-target image feature vector ($F_{tgt}-$) 740. The operation of the loss calculation module 750 is described in greater detail below in connection with FIG. 8. The loss values 760 are then used to train the weights of the image encoding neural network 300, the weights of the text encoding neural network 340, and δ (the trainable normalization scale parameter) of the fusion module 360. The training may be accomplished using any suitable training techniques in light of the present disclosure.

Figure 8:
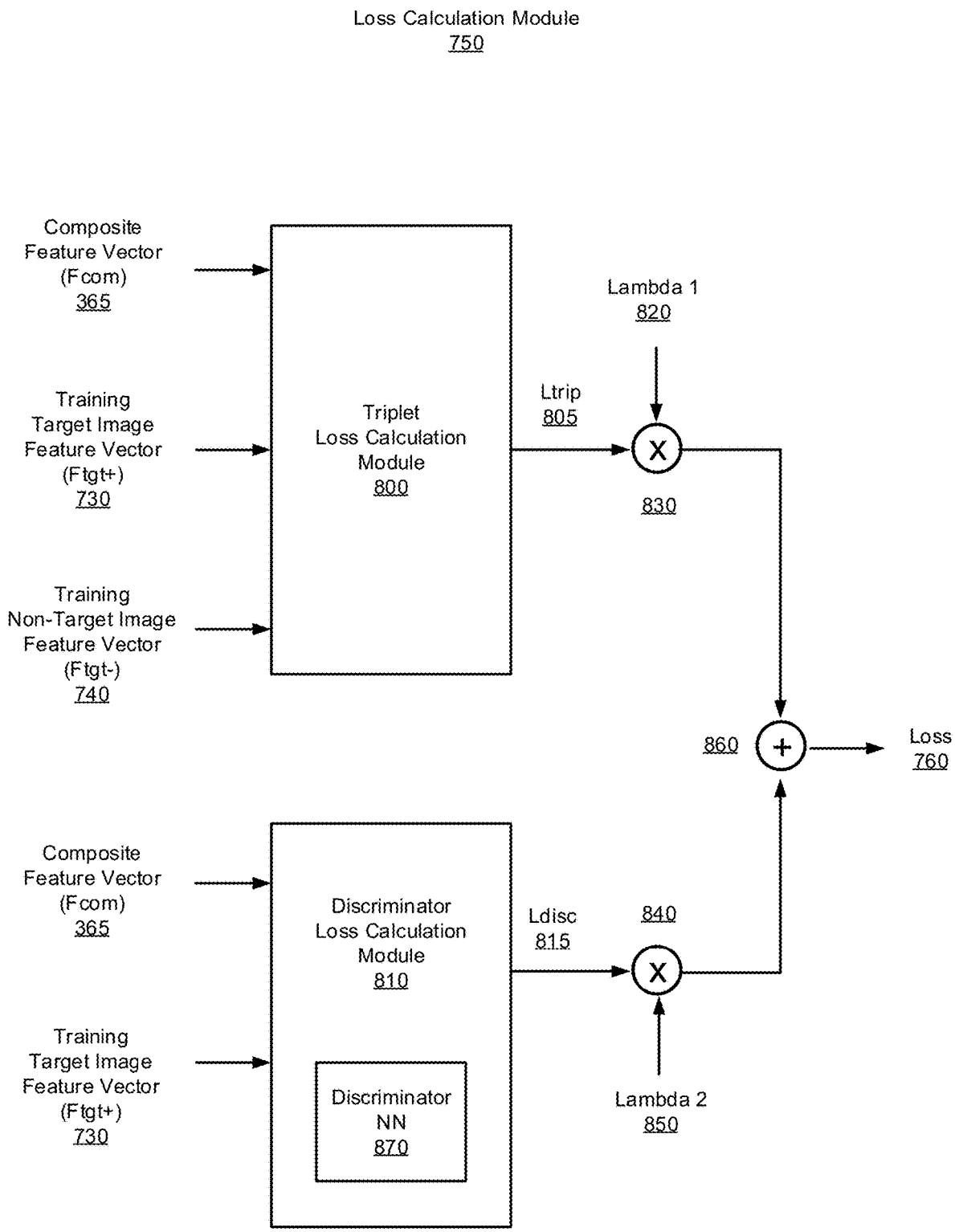
FIG. 8 is a block diagram of the loss calculation module, configured in accordance with an embodiment of the present disclosure.

FIG. 8 is a block diagram of the loss calculation module 750, configured in accordance with an embodiment of the present disclosure. The loss calculation module 750 is shown to include a triplet loss calculation module 800, a discriminator loss calculation module 810, a first scaling module 830, a second scaling module 840, and a summer 860.

The triplet loss calculation module 800 is configured to generate a first loss value $L_{triplet}$ 805 based on $F_{com}$ 365, $F_{tgt}+$ 730, and $F_{tgt}-$ 740. The primary training objective of the triplet loss is to constrain $F_{com}$ to align with $F_{tgt}++$ while simultaneously contrasting with $F_{tgt}--$. In some embodiments, $L_{triplet}$ may be generated according to the following equation:

$$\mathcal{L}_{triplet} = \log(1 + e^{\|f_{com} - f_{tgt}^+\|_2 - \|f_{com} - f_{tgt}^-\|_2})$$

where $\|\cdot\|_2$ denotes the L2 norm (e.g., a Euclidean distance). In some embodiments a cosine distance may be employed.

The discriminator loss calculation module 810 includes a discriminator neural network 870 and is configured to generate a second loss value $L_{disc}$ 815 based on From 365 and $F_{tgt}+$ 730. The discriminator loss helps to improve the alignment of $F_{com}$ with $F_{tgt}+$ by utilizing a discriminator that penalizes distributional divergence of linear projections of these features. In some embodiments, $L_{disc}$ may be generated according to the following equation:

$$\mathcal{L}_{disc} = -\mathbb{E}[\log(D(f_{tgt}+))] - \mathbb{E}[\log(1 - D(f_{com}))]$$

Where D(•) is the discriminator neural network 870 which is trained end-to-end along with the image search system, and $\mathbb{E}[\cdot]$ is the mathematical expected value operation.

The total loss 760 is a weighted combination of $L_{triplet}$ 805 and $L_{disc}$ 815. Weighting scale factors $\lambda_1$ 820 and $\lambda_2$ 850 are applied by first scaling module 830 and second scaling module 840 respectively. The scaled losses are then summed by summer 860 to generate loss 760. In some embodiments, loss 760 can be expressed as:

$$\mathcal{L}_{total} = \lambda_1 \mathcal{L}_{triplet} + \lambda_2 \mathcal{L}_{disc}$$

In some embodiments, the scale factors $\lambda_1$ 820 and $\lambda_2$ 850 are learnable scalar parameters that are also generated by the training process.

Methodology

Figure 9:
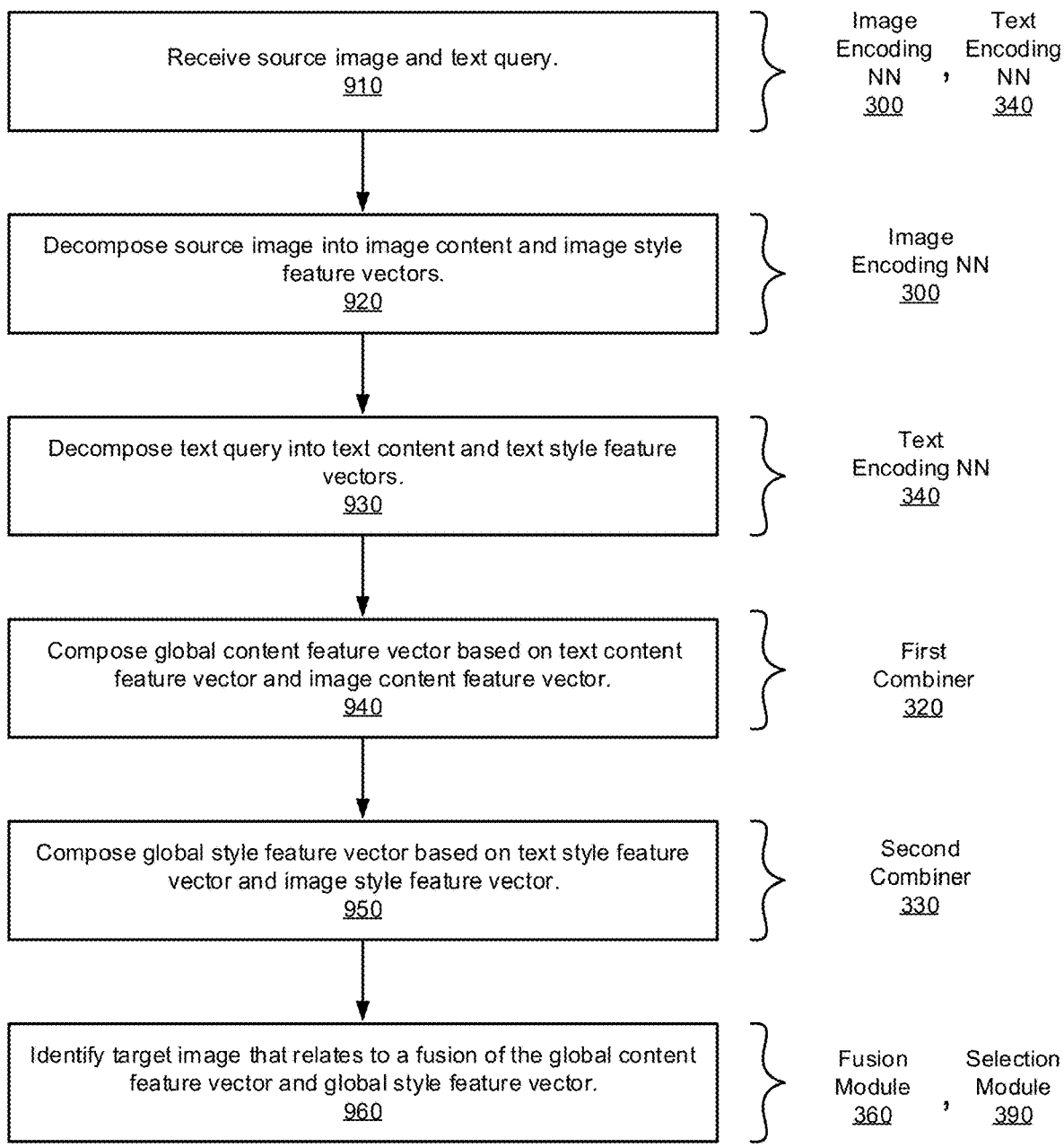
FIG. 9 is a flowchart illustrating a method for text conditioned image searching, in accordance with an embodiment of the present disclosure.

FIG. 9 is a flowchart 900 illustrating a method for text conditioned image searching, in accordance with an embodiment of the present disclosure. As can be seen, the method is described with reference to the configuration of image search system 130, and components thereof, of FIGS. 2-5, 7, and 8. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration; rather, the text conditioned search techniques provided herein can be used with a number of architectures and platforms and variations, as will be appreciated.

The method commences, at operation 910, by receiving a source image and a text query. The source image and text query define attributes of a target image.

The method continues, at operation 920, by decomposing the source image into an image content feature vector and an image style feature vector. In some embodiments, a first neural network is employed to extract the image content feature vector and the image style feature vector from the source image. In some embodiments, the first neural network is an image encoding convolutional neural network.

At operation 930, the text query is decomposed into a text content feature vector and a text style feature vector. In some embodiments, a second neural network is employed to extract the text style feature vector and the text content feature vector from the text query. In some embodiments, the second neural network is a text encoding neural network.

At operation 940, a global content feature vector is composed based on the text content feature vector and the image content feature vector. At operation 950, a global style feature vector is composed based on the text style feature vector and the image style feature vector. The global content feature vector 335 and the global style feature vector 325 provide disentanglement of style from content. In some embodiments, the global content feature vector is fused with the global style feature vector to generate a target composite feature vector. The fusing comprises calculating a residual offset between the first composition (content feature vector) and the second composition (style feature vector), and normalizing the residual offset.

At operation 960, one or more target images are identified. The identified target images relate to the features of the global content feature vector and the features of the global style feature vector such that the target images relate to the target image attributes. In some embodiments, the target image is identified by selecting the target image based on a distance between the target composite feature vector and a corresponding feature vector associated with one or more potential target images, wherein the distance is calculated as a Euclidian distance or a cosine distance.

In some embodiments, additional operations are performed. For example, in some embodiments, the image content feature vector is generated as global average pooled features provided by a final layer of the image encoding convolutional neural network, and the image style feature vector is generated as a Gram Matrix projection of features provided by a second to final layer of the image encoding convolutional neural network.

In some embodiments, a GRU is applied by the text encoding neural network to the text query, the text content feature vector is generated by applying an output of the GRU to a first fully connected layer of the text encoding neural network, and the text style feature vector is generated by applying the output of the GRU to a second fully connected layer of the text encoding neural network.

In some embodiments, a loss function is calculated for training of the first and second neural networks. The loss function is based on composite content and style feature vectors generated from a training source image and a training text query associated with the training source image. The loss function is further based on image feature vectors associated with a training target image and image feature vector associated with training non-target images.

Example Platform

Figure 10:
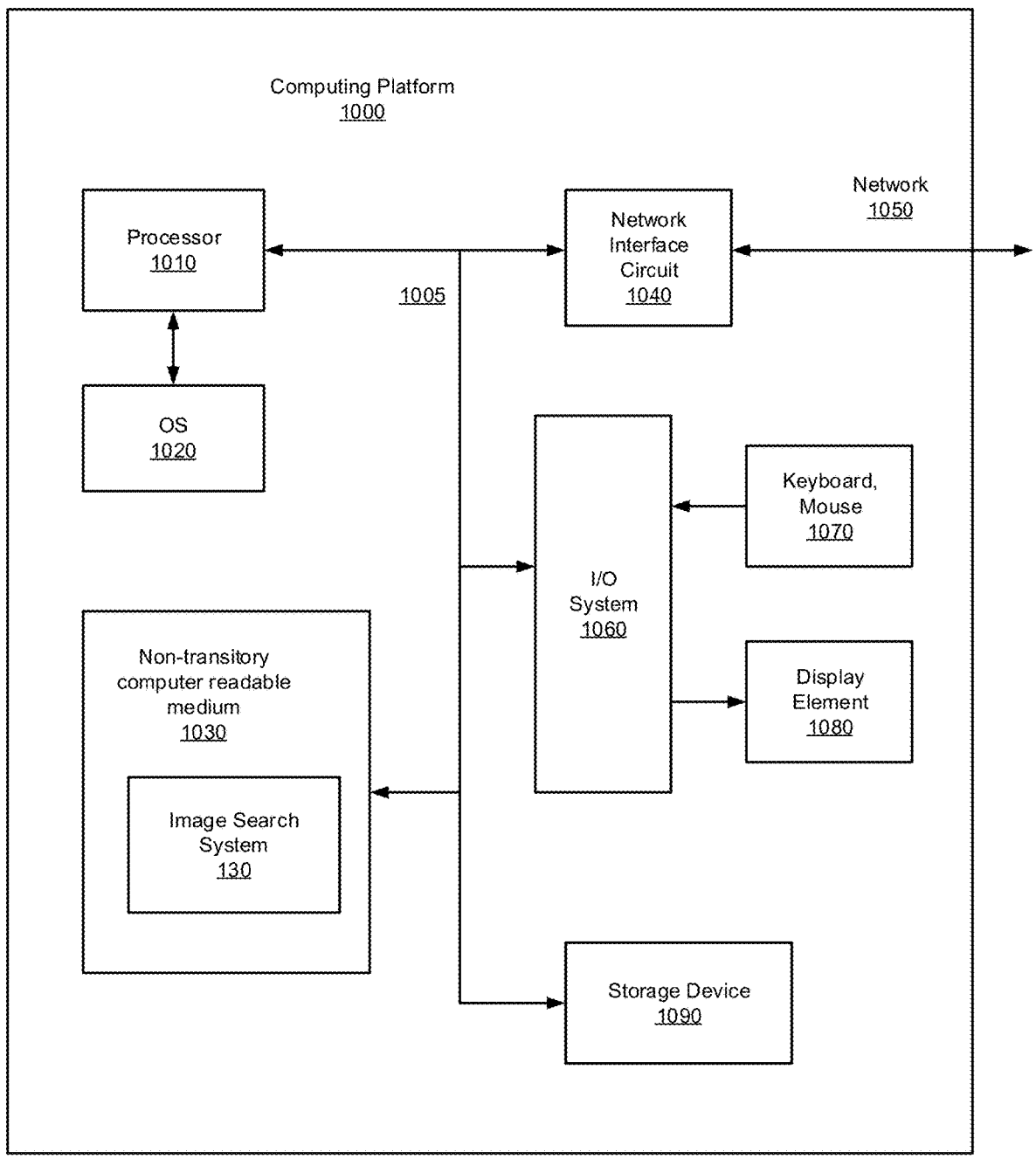
FIG. 10 is a block diagram schematically illustrating a computing platform configured to perform any of the techniques as variously described in this disclosure, configured in accordance with an embodiment of the present disclosure.

FIG. 10 is a block diagram schematically illustrating a computing platform 1000 configured to perform any of the techniques as variously described in this disclosure, configured in accordance with an embodiment of the present disclosure. For example, in some embodiments, the image search system 130 of FIG. 1, or any portions thereof as illustrated in FIGS. 2-5, 7, and 8, and the methodologies of FIG. 9, or any portions thereof, are implemented in the computing platform 1000. In some embodiments, the computing platform 1000 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 1000 includes one or more storage devices 1090 and/or non-transitory computer-readable media 1030 having encoded thereon one or more computer-executable instructions or software for implementing techniques as variously described in this disclosure. In some embodiments, the storage devices 1090 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1090 includes other types of memory as well, or combinations thereof. In one embodiment, the storage device 1090 is provided on the computing platform 1000. In another embodiment, the storage device 1090 is provided separately or remotely from the computing platform 1000. The non-transitory computer-readable media 1030 include, but are not limited to, one or more types of hardware memory, non-transitory tangible media (for example, one or more magnetic storage disks, one or more optical disks, one or more USB flash drives), and the like. In some embodiments, the non-transitory computer-readable media 1030 included in the computing platform 1000 store computer-readable and computer-executable instructions or software for implementing various embodiments. In one embodiment, the computer-readable media 1030 are provided on the computing platform 1000. In another embodiment, the computer-readable media 1030 are provided separately or remotely from the computing platform 1000.

The computing platform 1000 also includes at least one processor 1010 for executing computer-readable and computer-executable instructions or software stored in the storage device 1090 and/or non-transitory computer-readable media 1030 and other programs for controlling system hardware. In some embodiments, virtualization is employed in the computing platform 1000 so that infrastructure and resources in the computing platform 1000 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1005 is also provided to allow for communication between the various components listed above and/or other components not shown. Computing platform 1000 can be coupled to a network 1050 (e.g., a local or wide area network such as the internet), through network interface circuit 1040 to allow for communications with other computing devices, platforms, resources, clients, and Internet of Things (IoT) devices.

In some embodiments, a user interacts with the computing platform 1000 through an input/output system 1060 that interfaces with devices such as a keyboard and mouse 1070 and/or a display element (screen/monitor) 1080. The keyboard and mouse may be configured to provide a user interface to accept user input and guidance, and to otherwise control the image search system 130. The display element may be configured, for example, to display the results of the search using the disclosed techniques. In some embodiments, the computing platform 1000 includes other I/O devices (not shown) for receiving input from a user, for example, a pointing device or a touchpad, etc., or any suitable user interface. In some embodiments, the computing platform 1000 includes other suitable conventional I/O peripherals. The computing platform 1000 can include and/or be operatively coupled to various suitable devices for performing one or more of the aspects as variously described in this disclosure.

In some embodiments, the computing platform 1000 runs an operating system (OS) 1020, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1000 and performing the operations described in this disclosure. In one embodiment, the operating system runs on one or more cloud machine instances.

As will be appreciated in light of this disclosure, the various modules and components of the system, as shown in FIGS. 2-5, 7, and 8, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1000, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for image searching, the method comprising: decomposing, by a first neural network (NN), a source image into an image content feature vector and an image style feature vector, wherein style is descriptive of content; decomposing, by a second NN, a text query into a text content feature vector and a text style feature vector, wherein the text query defines a target image attribute; composing, by a first combiner, a global style feature vector based on the text style feature vector and the image style feature vector; composing, by a second combiner, a global content feature vector based on the text content feature vector and the image content feature vector; and identifying, by a selection module, a target image that relates to the global content feature vector and the global style feature vector so that the target image relates to the target image attribute, wherein style features of the image style feature vector that are unchanged by the text query are preserved in the target image.

Example 2 includes the subject matter of Example 1, wherein: decomposing the source image includes extracting, by the first NN, the image content feature vector and the image style feature vector from the source image; and decomposing the text query includes extracting, by the second NN, the text style feature vector and the text content feature vector from the text query.

Example 3 includes the subject matter of Examples 1 or 2, further comprising fusing, by a fusion module, the global content feature vector with the global style feature vector, to generate a target composite feature vector, wherein the fusing comprises calculating a residual offset between the global content feature vector and the global style feature vector and normalizing the residual offset.

Example 4 includes the subject matter of any of Examples 1-3, wherein identifying the target image includes selecting the target image based on a distance between the target composite feature vector and a corresponding feature vector associated with one or more potential target images, wherein the distance is calculated, by a distance calculation module, as a Euclidian distance or a cosine distance.

Example 5 includes the subject matter of any of Examples 1-4, wherein the first NN is an image encoding convolutional NN (CNN) and the method further comprises: generating the image content feature vector as a global average pooling of features provided by a final layer of the image encoding CNN; and generating the image style feature vector as a Gram Matrix projection of features provided by a second to final layer of the image encoding CNN.

Example 6 includes the subject matter of any of Examples 1-5, wherein the second NN is a text encoding NN and the method further comprises: applying a gated recurrent unit (GRU) of the text encoding NN to the text query; generating the text content feature vector by applying an output of the GRU to a first fully connected layer of the text encoding NN; and generating the text style feature vector by applying the output of the GRU to a second fully connected layer of the text encoding NN.

Example 7 includes the subject matter of any of Examples 1-6, further comprising calculating a loss function, by a loss calculation module, for training of the first NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

Example 8 is a system for image searching, the system comprising: a first neural network (NN) trained to generate an image content feature vector associated with content of a source image and an image style feature vector associated with style of the source image, wherein style is descriptive of content; a second NN trained to generate a text style feature vector associated with style of a text query and a text content feature vector associated with content of the text query; a fusion module configured to fuse a first combination of the image content feature vector and the text content feature vector, with a second combination of the image style feature vector and the text style feature vector, to generate a composite feature; and a selection module configured to select a target image based on a distance between the composite feature vector and a feature vector associated with one or more potential target images, the target images to be provided as a result of the image search, wherein style features of the image style feature vector that are unchanged by the text query are preserved in the target image.

Example 9 includes the subject matter of Example 8, wherein the first NN is an image encoding convolutional NN (CNN) trained to: generate the image content feature vector as a global average pooling of features provided by a final layer of the image encoding CNN; and generate the image style feature vector as a Gram Matrix projection of features provided by a second to final layer of the image encoding CNN.

Example 10 includes the subject matter of Examples 8 or 9, wherein the second NN is a text encoding NN trained to: apply a gated recurrent unit (GRU) of the text encoding NN to the text query; generate the text content feature vector by applying an output of the GRU to a first fully connected layer of the text encoding NN; and generate the text style feature vector by applying the output of the GRU to a second fully connected layer of the text encoding NN.

Example 11 includes the subject matter of any of Examples 8-10, wherein the fusing comprises calculating a residual offset between the first combination and the second combination and normalizing the residual offset.

Example 12 includes the subject matter of any of Examples 8-11, wherein the distance is calculated as a Euclidian distance or a cosine distance.

Example 13 includes the subject matter of any of Examples 8-12, further comprising a loss calculation module configured to calculate a loss function for training of the first NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

Example 14 is a computer program product including one or more non-transitory machine-readable mediums encoded with instructions that when executed by one or more processors cause a process to be carried out for image searching, the process comprising: receiving a source image and a text query defining a target image attribute; decomposing the source image into an image content feature vector and an image style feature vector, wherein style is descriptive of content; decomposing the text query into a text content feature vector and a text style feature vector; composing a global style feature vector based on the text style feature vector and the image style feature vector; composing a global content feature vector based on the text content feature vector and the image content feature vector; and identifying a target image that relates to the global content feature vector and the global style feature vector so that the target image relates to the target image attribute, wherein style features of the image style feature vector that are unchanged by the text query are preserved in the target image.

Example 15 includes the subject matter of Example 14, wherein: decomposing the source image includes extracting, by a first neural network (NN), the image content feature vector and the image style feature vector from the source image; and decomposing the text query includes extracting, by a second NN, the text style feature vector and the text content feature vector from the text query.

Example 16 includes the subject matter of Examples 14 or 15, wherein the process further comprises fusing the global content feature vector with the global style feature vector, to generate a target composite feature vector, wherein the fusing comprises calculating a residual offset between the global content feature vector and the global style feature vector and normalizing the residual offset.

Example 17 includes the subject matter of any of Examples 14-16, wherein identifying the target image includes selecting the target image based on a distance between the target composite feature vector and a corresponding feature vector associated with one or more potential target images, wherein the distance is calculated as a Euclidian distance or a cosine distance.

Example 18 includes the subject matter of any of Examples 14-17, wherein the first NN is an image encoding convolutional NN (CNN) and the process further comprises: generating the image content feature vector as a global average pooling of features provided by a final layer of the image encoding CNN; and generating the image style feature vector as a Gram Matrix projection of features provided by a second to final layer of the image encoding CNN.

Example 19 includes the subject matter of any of Examples 14-18, wherein the second NN is a text encoding NN and the process further comprises: applying a gated recurrent unit (GRU) of the text encoding NN to the text query; generating the text content feature vector by applying an output of the GRU to a first fully connected layer of the text encoding NN; and generating the text style feature vector by applying the output of the GRU to a second fully connected layer of the text encoding NN.

Example 20 includes the subject matter of any of Examples 14-19, wherein the process further comprises calculating a loss function for training of the first NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for image searching, the method comprising:
   decomposing, by a first neural network (NN), a source image into an image content feature vector and an image style feature vector, wherein style is descriptive of content;
   decomposing, by a second NN, a text query into a text content feature vector and a text style feature vector, wherein the text query defines a target image attribute;
   composing, by a first combiner, a global style feature vector based on the text style feature vector and the image style feature vector;
   composing, by a second combiner, a global content feature vector based on the text content feature vector and the image content feature vector;
   calculating a residual offset between the global content feature vector and the global style feature vector;
   normalizing the residual offset to produce a target composite feature vector; and
   identifying, by a selection module, a target image that relates to the target composite feature vector so that the target image relates to the target image attribute, wherein style features of the image style feature vector that are unchanged by the text query are preserved in the target image.

2. The method of claim 1, wherein:
   decomposing the source image includes extracting, by the first NN, the image content feature vector and the image style feature vector from the source image; and
   decomposing the text query includes extracting, by the second NN, the text style feature vector and the text content feature vector from the text query.

3. The method of claim 1, wherein the first NN is an image encoding convolutional NN, and wherein the method further comprises generating the image content feature vector as a global average pooling of features provided by a final layer of the image encoding convolutional NN.

4. The method of claim 3, wherein identifying the target image includes selecting the target image based on a distance between the target composite feature vector and a corresponding feature vector associated with one or more potential target images, wherein the distance is calculated, by a distance calculation module, as a Euclidian distance or a cosine distance.

5. The method of claim 2, wherein the first NN is an image encoding convolutional NN (CNN) and the method further comprises:
   generating the image content feature vector as a global average pooling of features provided by a final layer of the image encoding CNN; and
   generating the image style feature vector as a Gram Matrix projection of features provided by a second to final layer of the image encoding CNN.

6. The method of claim 2, wherein the second NN is a text encoding NN and the method further comprises:
   applying a gated recurrent unit (GRU) of the text encoding NN to the text query;

generating the text content feature vector by applying an output of the GRU to a first fully connected layer of the text encoding NN; and generating the text style feature vector by applying the output of the GRU to a second fully connected layer of the text encoding NN.

7. The method of claim 2, further comprising calculating a loss function, by a loss calculation module, for training of the first NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

8. A system for performing an image search, the system comprising:
  an image encoding convolutional neural network (NN) trained to generate
    an image content feature vector as a global average pooling of features provided by a final layer of the image encoding convolutional NN, wherein the image content feature vector is associated with a content of a source image, and
    an image style feature vector associated with a style of the source image, wherein the style is descriptive of the content;
  a second NN trained to generate a text style feature vector associated with a style of a text query and a text content feature vector associated with a content of the text query;
  a fusion module configured to fuse a first combination of the image content feature vector and the text content feature vector, with a second combination of the image style feature vector and the text style feature vector, to generate a composite feature vector; and
  a selection module configured to select a target image based on a distance between the composite feature vector and a feature vector associated with one or more potential target images, the target image to be provided as a result of the image search, wherein style features of the image style feature vector that are unchanged by the text query are preserved in the target image.

9. The system of claim 8, wherein the image encoding convolutional NN (CNN) is further trained to:
  generate the image style feature vector as a Gram Matrix projection of features provided by a second to final layer of the image encoding CNN.

10. The system of claim 8, wherein the second NN is a text encoding NN trained to:
  apply a gated recurrent unit (GRU) of the text encoding NN to the text query;
  generate the text content feature vector by applying an output of the GRU to a first fully connected layer of the text encoding NN; and
  generate the text style feature vector by applying the output of the GRU to a second fully connected layer of the text encoding NN.

11. The system of claim 8, wherein the fusing comprises calculating a residual offset between the first combination and the second combination and normalizing the residual offset.

12. The system of claim 8, wherein the distance is calculated as a Euclidian distance or a cosine distance.

13. The system of claim 8, further comprising a loss calculation module configured to calculate a loss function for training of the image encoding convolutional NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

14. A computer program product including one or more non-transitory machine-readable mediums encoded with instructions that when executed by one or more processors cause a process to be carried out for image searching, the process comprising:
  receiving a source image and a text query defining a target image attribute;
  decomposing the source image into an image content feature vector and an image style feature vector, wherein style is descriptive of content;
  decomposing the text query into a text content feature vector and a text style feature vector;
  composing a global style feature vector based on the text style feature vector and the image style feature vector;
  composing a global content feature vector based on the text content feature vector and the image content feature vector;
  calculating a residual offset between the global content feature vector and the global style feature vector;
  normalizing the residual offset to produce a target composite feature vector; and
  identifying a target image that relates to the target composite feature vector so that the target image relates to the target image attribute, wherein style features of the image style feature vector that are unchanged by the text query are preserved in the target image.

15. The computer program product of claim 14, wherein:
  decomposing the source image includes extracting, by a first neural network (NN), the image content feature vector and the image style feature vector from the source image; and
  decomposing the text query includes extracting, by a second NN, the text style feature vector and the text content feature vector from the text query.

16. The computer program product of claim 15, wherein the first NN is an image encoding convolutional NN, and wherein the process further comprises generating the image style feature vector as a Gram Matrix projection of features provided by a second to final layer of the image encoding convolutional NN.

17. The computer program product of claim 14, wherein identifying the target image includes selecting the target image based on a distance between the target composite feature vector and a corresponding feature vector associated with one or more potential target images, wherein the distance is calculated as a Euclidian distance or a cosine distance.

18. The computer program product of claim 15, wherein the first NN is an image encoding convolutional NN (CNN) and the process further comprises:
  generating the image content feature vector as a global average pooling of features provided by a final layer of the image encoding CNN; and
  generating the image style feature vector as a Gram Matrix projection of features provided by a second to final layer of the image encoding CNN.

19. The computer program product of claim 15, wherein the second NN is a text encoding NN and the process further comprises:
  applying a gated recurrent unit (GRU) of the text encoding NN to the text query;
  generating the text content feature vector by applying an output of the GRU to a first fully connected layer of the text encoding NN; and
  generating the text style feature vector by applying the output of the GRU to a second fully connected layer of the text encoding NN.

20. The computer program product of claim 15, wherein the process further comprises calculating a loss function for training of the first NN and the second NN, the loss function based on a composite content feature vector and a composite style feature vector generated from a training source image and a training text query associated with the training source image, wherein the loss function is further based on image feature vectors associated with a training target image and image feature vectors associated with training non-target images.

* * * * *